United States Patent
Wang

[11] Patent Number: 6,067,010
[45] Date of Patent: May 23, 2000

[54] AUXILIARY SAFETY WARNING LAMP SYSTEM FOR A VEHICLE

[75] Inventor: Ching-Yung Wang, Taichung Hsien, Taiwan

[73] Assignee: Papacy Products Co., Ltd., Taichung Hsien, Taiwan

[21] Appl. No.: 09/213,276

[22] Filed: Dec. 17, 1998

[51] Int. Cl.⁷ .................................................. B60Q 1/22
[52] U.S. Cl. ......................... 340/463; 340/464; 340/478; 340/479
[58] Field of Search .................................. 340/463, 462, 340/466, 472, 478, 475, 464, 479; 362/503

[56] References Cited

U.S. PATENT DOCUMENTS

| | | | |
|---|---|---|---|
| 4,556,862 | 12/1985 | Meinershagen | 340/478 |
| 4,791,401 | 12/1988 | Heidman, Jr. | 340/477 |
| 4,954,808 | 9/1990 | Duerkob | 340/475 |
| 5,186,533 | 2/1993 | Hori | 340/479 |
| 5,663,707 | 9/1997 | Bartilucci | 340/479 |
| 5,764,141 | 6/1998 | Chang | 340/475 |

*Primary Examiner*—Edward Lefkowitz
*Assistant Examiner*—Davetta W. Goins
*Attorney, Agent, or Firm*—Rosenberg, Klein & Lee

[57] ABSTRACT

An auxiliary safety warning lamp system for a vehicle comprising a lamp unit, a remote control unit including a receiver attached to the lamp unit, and an emitter controlled by an operator and emitting signals to the receiver for controlling operation of the lamp unit, a control unit connected between the receiver and the lamp unit for identifying the signals emitted from the emitter to the receiver so as to control functions of the lamp unit, and a switch-type power adjustable supply unit connected to the control unit for supplying power to the lamp unit.

1 Claim, 6 Drawing Sheets

AUXILIARY SAFETY WARNING LAMP SYSTEM FOR A VEHICLE

BACKGROUND OF THE INVENTION

1. Field of the Invention

The present invention relates to an auxiliary safety warning lamp system for a vehicle such as a car, a motorcycle, a bicycle and the like.

2. Description of the Related Prior Art

A conventional car has a braking light mounted in the rear side thereof so to provide a warning effect when the brake of the car is pressed. Normally, when the car is turned right or left, the direction light will light. In such a manner, if the driver presses the brake when the car is about to be turned right or left, the braking light and the direction light will light simultaneously. However, when the car is driven in a heavy fog or in a bad view condition, it is not easy to distinguish the braking light from the direction light when they light simultaneously such that a person cannot sure if the car is about to be turned right or left, and such that the accident easily occurs. The present invention has arisen to overcome the disadvantage of the conventional braking light.

SUMMARY OF THE INVENTION

The primary objective of the present invention is to provide an auxiliary safety warning lamp system for a vehicle comprising a lamp unit, a remote control unit including a receiver attached to the lamp unit, and an emitter being controlled by an operator and emitting signals to the receiver for controlling operation of the lamp unit, a control unit connected between the receiver and the lamp unit for identifying the signals emitted from the emitter to the receiver so as to control functions of the lamp unit, and a switch-type power adjustable supply unit connected to the control unit for supplying power to the lamp unit.

The switch-type power adjustable supply unit is a switching steady state circuit and includes a direct-current generator, a storage cell, and a dry cell.

The lamp unit includes a first side having a plurality of first lights contained therein, a mediate portion having a plurality of second lights contained therein, and a second side having a plurality of third lights contained therein.

In such a manner, the lamp unit is adapted to function as a thunderclap type warning lamp unit for indicating the position of the vehicle when the lamp unit is placed in a stand-by condition where each of the second lights in turn twinkle from the first side to the second side and then in turn twinkle from the second side to the first side continuously.

Alternatively, each of the second lights of the lamp unit is adapted to simultaneously twinkle when the vehicle is placed in a braking condition.

When the vehicle is turned left, each of the second lights of the lamp unit is adapted to twinkle simultaneously and continuously, and each of the first lights simultaneously twinkles. Alternatively, when the vehicle is turned right, each of the second lights of the lamp unit is adapted to simultaneously twinkle continuously, and each of the third lights twinkles simultaneously.

Alternatively, when the vehicle is placed in a special condition, each of the first lights and the third lights of the lamp unit is adapted to simultaneously twinkle.

Further objectives and advantages of the present invention will become apparent after a careful reading of the detailed description with reference to the accompanying drawings.

DETAILED DESCRIPTION OF THE PREFERRED EMBODIMENTS

Figure 1:
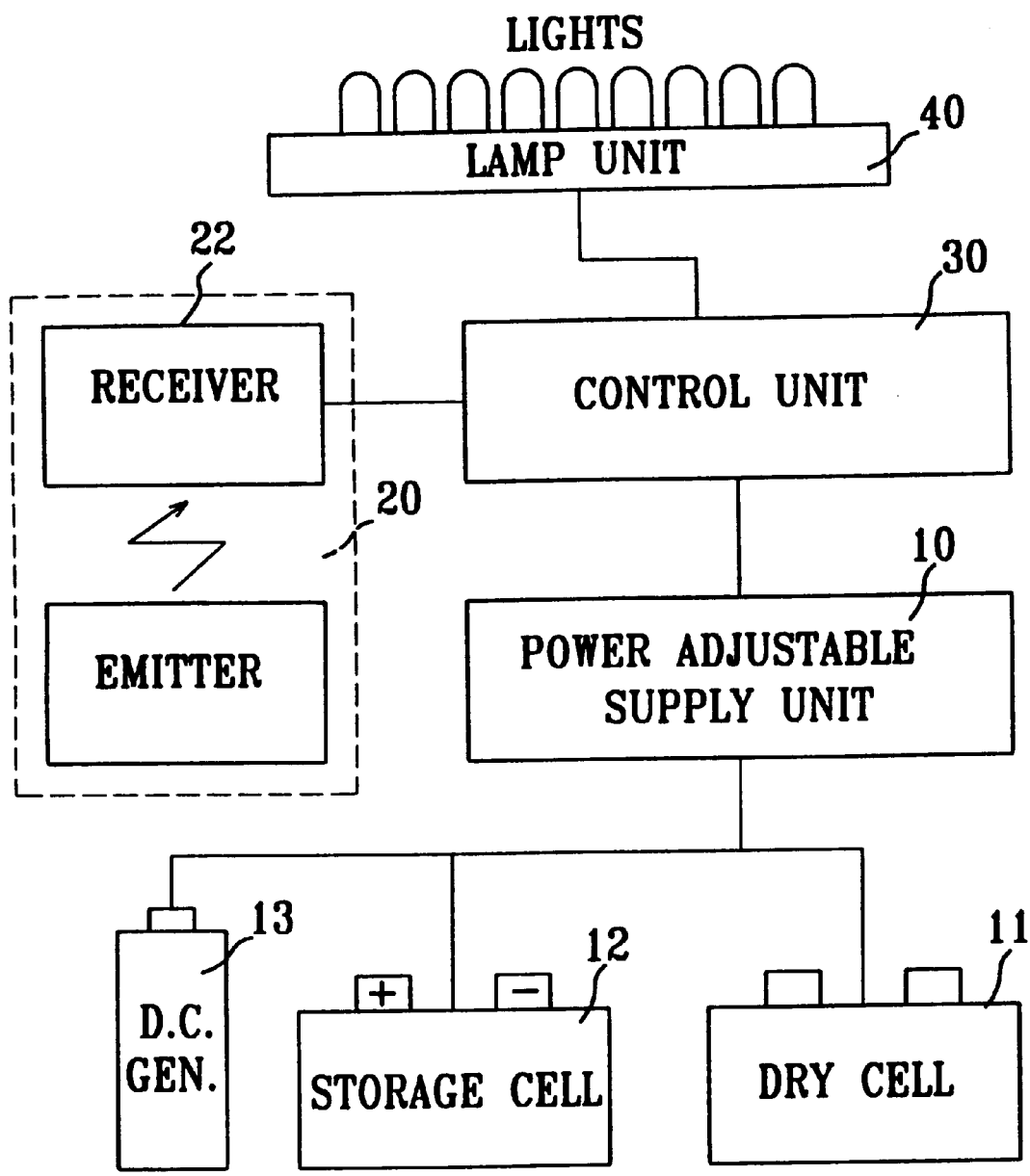
FIG. 1 is a block diagram of an auxiliary safety warning lamp system according to the present invention.
Figure 2:
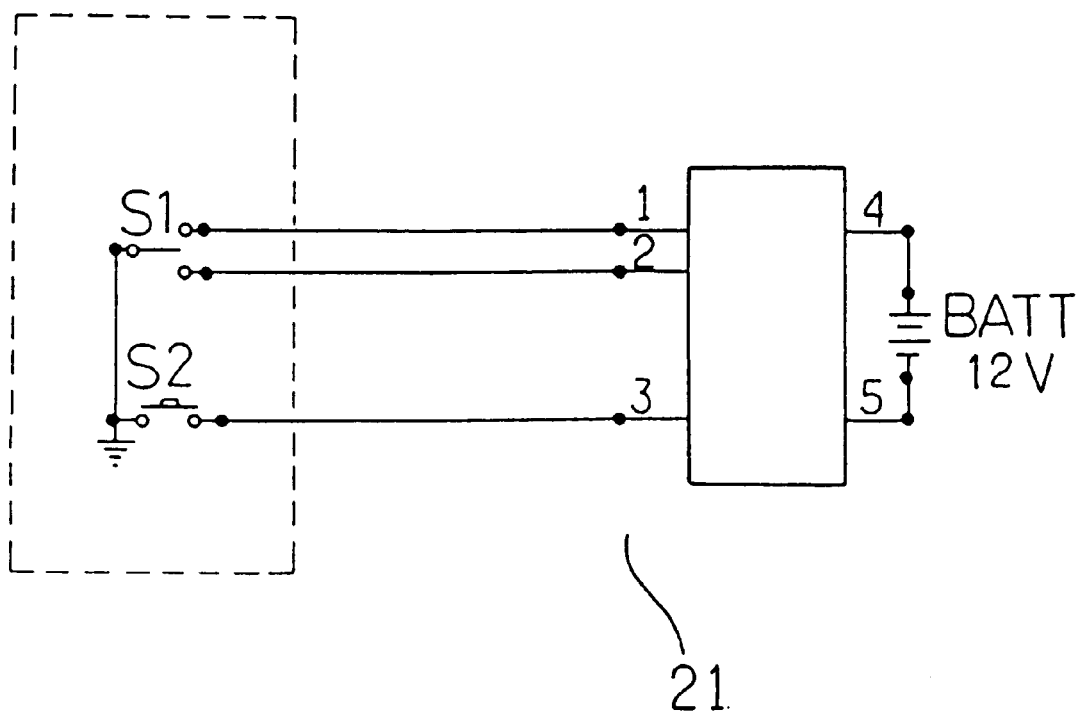
FIG. 2 is a circuit diagram of an emitter of the auxiliary safety warning lamp system as shown in FIG. 1.
Figure 3:
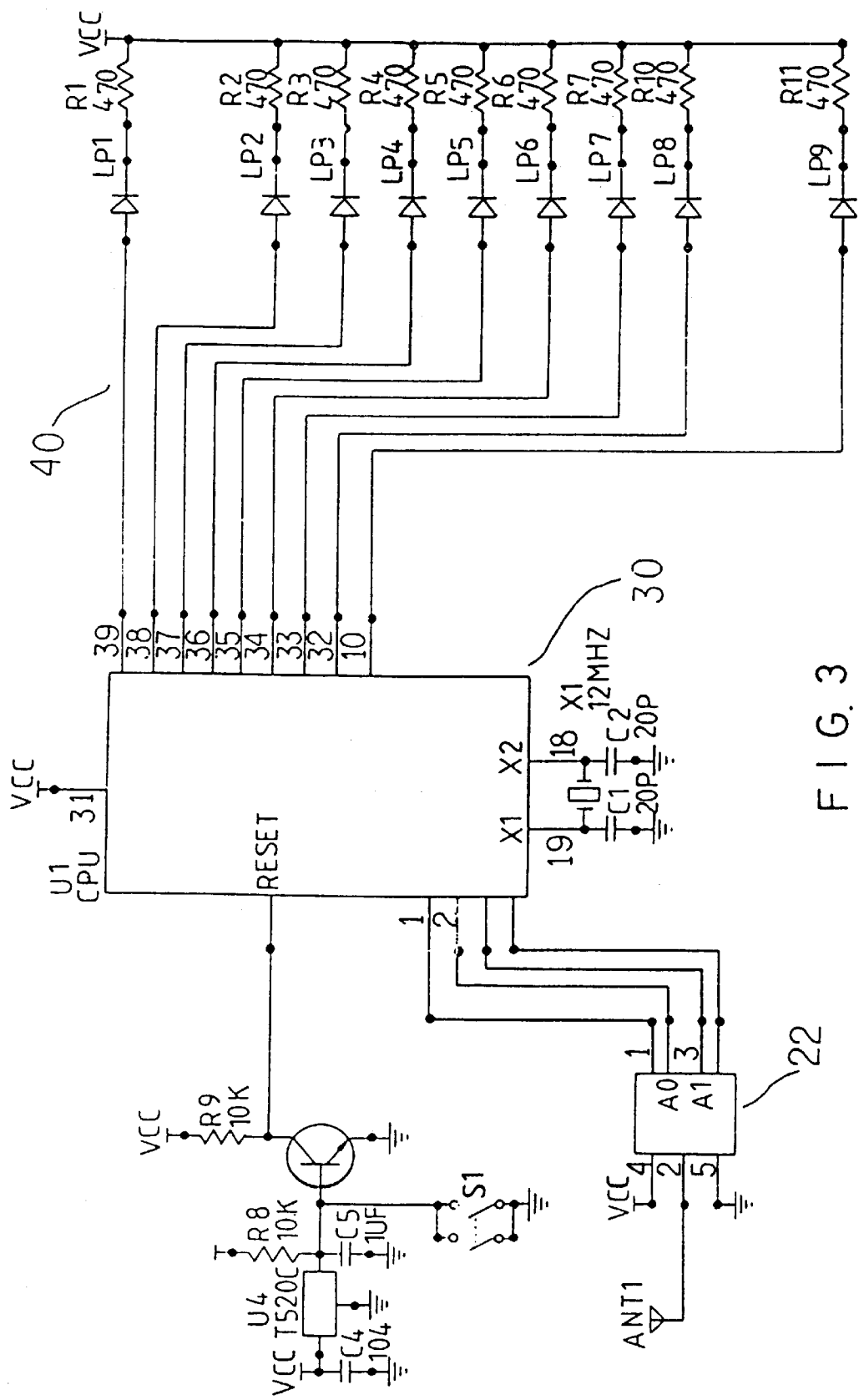
FIG. 3 is a circuit diagram of the auxiliary safety warning lamp system as shown in FIG. 1.
Figure 4:
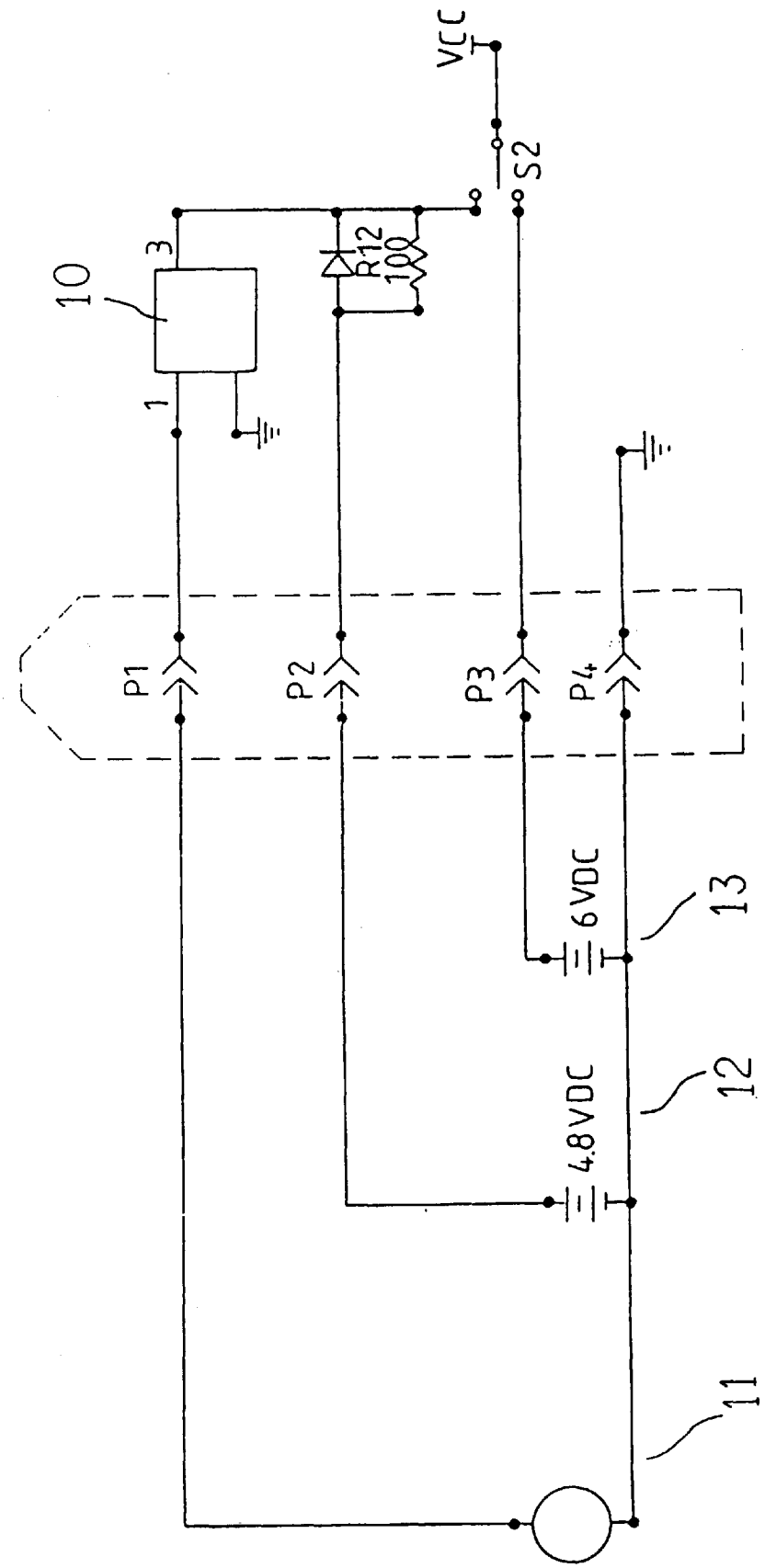
FIG. 4 is a circuit diagram of the switch-type power adjustable supply unit as shown in FIG. 1.

Now, with reference to FIGS. 1–5, an auxiliary safety warning lamp system according to the present invention is available for a car, a motorcycle, a bicycle, a stroller and the like, and comprises a lamp unit 40, a remote control unit 20 including a receiver 22 attached to the lamp unit 40, and an emitter 21 being controlled by an operator and emitting signals to the receiver 22 for controlling operation of the lamp unit 40, a control unit 30 connected between the receiver and the lamp unit 40 for reading and identifying the signals emitted from the emitter 21 to the receiver 22 so as to control functions of the lamp unit 40, and a switch-type power adjustable supply unit 10 connected to the control unit 30 for supplying power to the lamp unit 40.

The switch-type power adjustable supply unit 10 is a switching steady state circuit, and can be in the form of a direct-current generator 11, a storage cell 12, or a dry cell 13. The voltage supplied from the switch-type power adjustable supply unit 10 is retained a constant so as to prevent the lamp unit 40 from being inoperative due to insufficient voltage supply, or to prevent the lamp unit 40 from being damaged due to excessive voltage supply.

The emitter 21 of the remote control unit 20 can be used to control the operation of various working conditions of the lamp unit 40 so as to simplify the fitting of electric wires required by the warning lamp system. The operating signals emitted from the emitter 21 to the receiver 22 is then supplied to the control unit 10 to be read and identified.

The lamp unit 40 includes a first side having a plurality of first lights 41 contained therein, a mediate portion having a plurality of second lights 43 contained therein, and a second side having a plurality of third lights 42 contained therein. Preferably, each of the first lights 41 and the third lights 42 is a yellow light, and each of the second lights 43 is a red light.

In practice, with reference to FIGS. 5–9, the lamp unit 40 can be used to produce various warning functions which will be described as follows.

Figure 5:
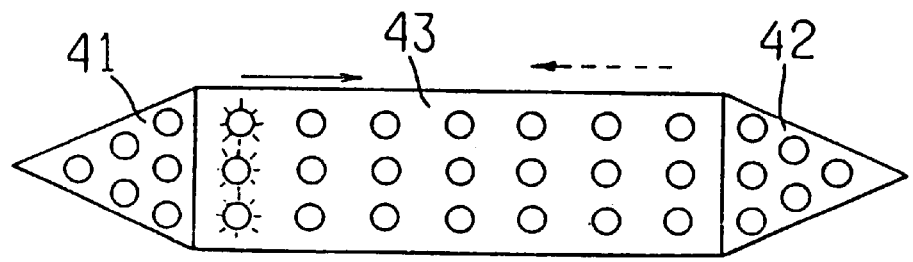
FIG. 5 is a schematic view showing the lamp unit of the auxiliary safety warning lamp system being disposed in a stand-by condition.

Now, with reference to FIG. 5, the lamp unit 40 is adapted to function as a thunderclap type warning lamp unit for indicating the position of the vehicle when the lamp unit 40 is placed in a stand-by condition where each of the red lights 43 in turn twinkle from the first side to the second side as shown in the arrow in solid lines and then in turn twinkle from the second side to the first side as shown in the arrow in phantom lines continuously so as to produce an intermediate "light bar".

Figure 6:
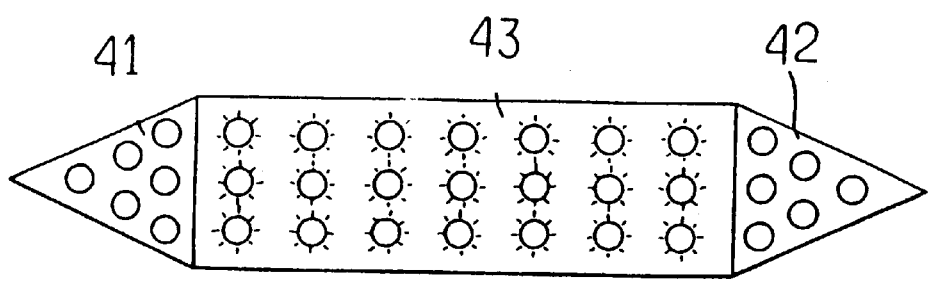
FIG. 6 is a schematic view showing the lamp unit of the auxiliary safety warning lamp system being disposed in a braking condition.

With reference to FIG. 6, each of the red lights 43 of the lamp unit 40 is adapted to simultaneously twinkle when the vehicle is placed in a braking condition.

Figure 7:
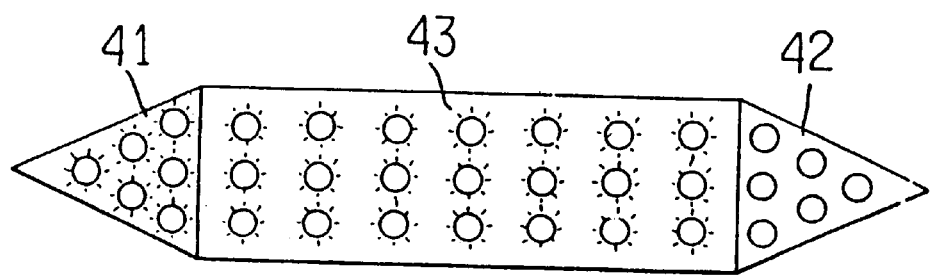
FIG. 7 is a schematic view showing the lamp unit of the auxiliary safety warning lamp system being disposed in a condition where the vehicle is about to be turned left.

With reference to FIG. 7, when the vehicle is about to be turned left, each of the red lights 43 of the lamp unit 40 is adapted to twinkle simultaneously and continuously, and each of the yellow lights 41 twinkles simultaneously.

Figure 8:
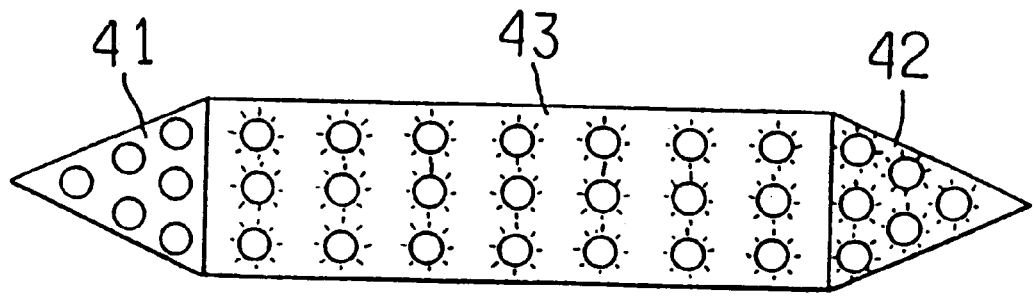
FIG. 8 is a schematic view showing the lamp unit of the auxiliary safety warning lamp system being disposed in a condition where the vehicle is about to be turned right.

With reference to FIG. 8, when the vehicle is about to be turned right, each of the red lights 43 of the lamp unit 40 is adapted to twinkle simultaneously and continuously, and each of the yellow lights 42 twinkles simultaneously.

Figure 9:
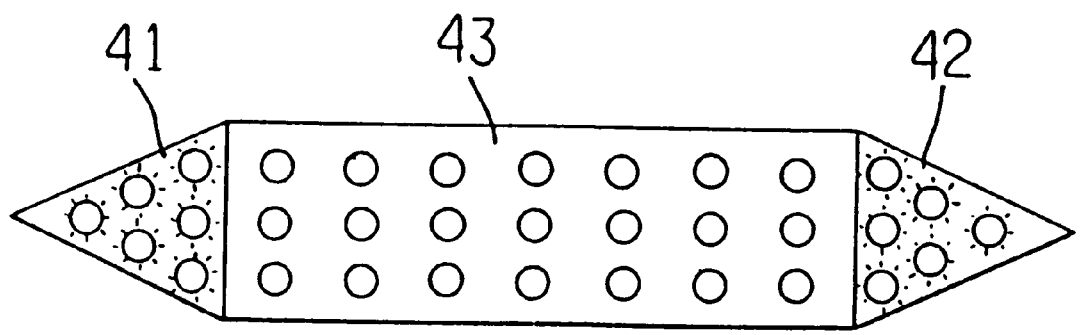
FIG. 9 is a schematic view showing the lamp unit of the auxiliary safety warning lamp system being disposed in a special condition.

With reference to FIG. 9, when the vehicle is placed in a special condition, each of the yellow lights 41 and each of the yellow lights 42 of the lamp unit 40 is adapted to simultaneously twinkle.

In such a manner, the lamp unit 40 of the auxiliary safety warning lamp system according to the present invention can be adapted to produce an intermediate "light bar" to provide various warning functions so as to indicate the current position and condition of the vehicle, thereby facilitating other people to identify existence of the vehicle, thereby decreasing the occurrence of the accidents so as to secure the driver's safety.

In addition, the arrangement of the remote control unit 20 can be used to simplify the fitting of electric wires required by the warning lamp system, thereby preventing the disturbance of detachment of the electric wires, and thereby enhancing the aesthetic appearance of the warning lamp system. Moreover, the warning lamp system can operate normally when the voltage supply is not steady by means of usage of the switching steady state circuit of the switch-type power adjustable supply unit 10.

Although the present invention has been described with a certain degree of particularity, it is to be understood that the present disclose has been made by way of example only and that many other possible modifications and variations can be made without departing from the scope and spirit of the present invention.

I claim:

1. An auxiliary safety warning lamp system for a vehicle comprising:

a lamp unit including a first side containing a plurality of first lights arranged in multiple columns of first light bars, a mediate portion containing a plurality of second lights arranged in multiple columns of second light bars, and a second side containing a plurality of third lights arranged in multiple columns of third light bars;

a remote control unit including a receiver attached to the lamp unit, and an emitter being controlled by an operator and emitting signals to the receiver for controlling operation of the lamp unit;

a control unit connected between the receiver and the lamp unit for identifying the signals emitted from the emitter to the receiver so as to control functions of the lamp unit; and a switch-type power adjustable supply unit to the control unit for supplying power to the lamp unit, wherein the switch-type power adjustable supply is selected from the group consisting of a direct-current generator, a storage cell, a dry cell and a switching steady state circuit;

whereby, when the vehicle is turned left, the control unit lights each of the second lights of the lamp unit simultaneously and continuously, and lights each of the first lights of the lamp unit to simultaneously twinkle;

whereby when the control unit places the lamp unit in a stand-by condition each of the second lights twinkle in turn from the first side to the second side and then twinkle in turn from the second side to the first side to define a continuously repetitive pattern, the lamp unit thereby functioning as a warning lamp unit for increasing visibility of the vehicle to operators of other vehicles;

the control unit lighting all of the second lights to twinkle simultaneously responsive to the vehicle being in a braking condition;

the control unit lighting each of the second lights of the lamp unit to simultaneously light continuously, and light each of the third lights to twinkle simultaneously responsive to the vehicle being turned right; and the control unit lighting each of the first and third lights of the lamp unit to simultaneously twinkle responsive to the vehicle being placed in a special condition.

* * * * *